(12) United States Patent
Bhimani et al.

(10) Patent No.: US 10,719,354 B2
(45) Date of Patent: Jul. 21, 2020

(54) CONTAINER WORKLOAD SCHEDULER AND METHODS OF SCHEDULING CONTAINER WORKLOADS

(71) Applicant: Samsung Electronics Co., Ltd., Suwon-si, Gyeonggi-do (KR)

(72) Inventors: Janki Sharadkumar Bhimani, Billerica, MA (US); Anand Subramanian, San Jose, CA (US); Jingpei Yang, Santa Clara, CA (US); Vijay Balakrishnan, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 15/820,856

(22) Filed: Nov. 22, 2017

(65) Prior Publication Data

US 2018/0365055 A1 Dec. 20, 2018

Related U.S. Application Data

(60) Provisional application No. 62/522,630, filed on Jun. 20, 2017.

(51) Int. Cl.
*G06F 9/48* (2006.01)
*G06F 9/50* (2006.01)

(52) U.S. Cl.
CPC .......... *G06F 9/4881* (2013.01); *G06F 9/505* (2013.01); *G06F 9/5027* (2013.01); *G06F 9/5033* (2013.01); *G06F 2209/5022* (2013.01)

(58) Field of Classification Search
CPC .............. G06F 9/4881; G06F 9/505; G06F 2009/5022; G06F 9/5033
See application file for complete search history.

(56) References Cited

U.S. PATENT DOCUMENTS 9,690,622 B1 6/2017 Argenti et al.
9,767,274 B2 9/2017 Banga et al.
(Continued)

FOREIGN PATENT DOCUMENTS

CN 106453492 A 2/2017

OTHER PUBLICATIONS

Wikipedia, "Docker (software)-wikipedia the free encyclopedia," 2016, [Online; accessed Jul. 12, 2016]. [On-line]. Available: {https://en.wikipedia.org/w/index.php?title=Docker (software)&oldid=728586136}.

(Continued)

*Primary Examiner* — Jacob D Dascomb
(74) *Attorney, Agent, or Firm* — Lewis Roca Rothgerber Christie LLP (57) ABSTRACT

A system for scheduling the execution of container workloads from a series of applications and a series of containers of each application. The system includes a processor and a non-transitory computer-readable storage medium having instructions stored thereon, which, when executed by the processor, cause the system to calculate a conflict penalty matrix including a conflict penalty for each potential combination of container workloads of the plurality of containers, and calculate a minimum total conflict penalty of the container workloads and a number of workload batches for executing the container workloads. The number of workload batches is associated with the minimum total conflict penalty. The instructions, when executed by the processor, further cause the system to assign the container workloads to the workload batches based on the minimum total conflict penalty and the number of the workload batches.

20 Claims, 3 Drawing Sheets

(56) References Cited

U.S. PATENT DOCUMENTS

| | | | |
|---|---|---|---|
| 2004/0044643 | A1 | 3/2004 | DeVries et al. |
| 2010/0017650 | A1 | 1/2010 | Chin et al. |
| 2011/0191400 | A1* | 8/2011 | Das Gupta ............. G06N 20/00 708/446 |
| 2014/0114466 | A1 | 4/2014 | Luo |
| 2015/0378764 | A1* | 12/2015 | Sivasubramanian ........................ G06F 9/45558 718/1 |
| 2016/0142253 | A1 | 5/2016 | Steinder et al. |
| 2016/0150002 | A1* | 5/2016 | Hildrum ............... H04L 67/104 709/201 |
| 2016/0162320 | A1 | 6/2016 | Singh et al. |
| 2017/0070561 | A1 | 3/2017 | Li et al. |
| 2017/0083368 | A1 | 3/2017 | Bishop et al. |
| 2017/0083380 | A1* | 3/2017 | Bishop .................. G06F 9/5083 |
| 2019/0286486 | A1* | 9/2019 | Ma ........................ G06F 9/5016 |

OTHER PUBLICATIONS

C. Anderson, "Docker." IEEE Software, vol. 32, No. 3, 2015.

P. Di Tommaso, E. Palumbo, M. Chatzou, P. Prieto, M. L. Heuer, and C. Notredame, "The impact of docker containers on the performance of genomic pipelines," PeerJ, vol. 3, p. e1273, 2015.

J. Fink, "Docker: a software as a service, operating system-level virtualization framework," Code4Lib Journal, vol. 25, 2014.

W. Felter, A. Ferreira, R. Rajamony, and J. Rubio, "An updated performance comparison of virtual machines and linux containers," in Performance Analysis of Systems and Software (ISPASS), 2015 IEEE International Symposium On. IEEE, 2015, pp. 171-172.

R. Dua, A. R. Raja, and D. Kakadia, "Virtualization vs containerization to support paas," in Cloud Engineering (IC2E), 2014 IEEE International Conference on. IEEE, 2014, pp. 610-614.

A. Olbert, D. O'Neill, C. Neufeld et al., "Managing multiple virtual machines," 2003, U.S. Appl. No. 10/413,440.

M. Ronstrom and L. Thalmann, "MySQL cluster architecture overview," MySQL Technical White Paper, 2004.

K.-T. Seo, H.-S. Hwang, I.-Y. Moon, O.-Y. Kwon, and B.-J. Kim, "Performance comparison analysis of linux container and virtual machine for building cloud," Advanced Science and Technology Letters, vol. 66, pp. 105-111, 2014.

Q. Xu, H. Siyamwala, M. Ghosh, T. Suri, M. Awasthi, Z. Guz, A. Shayesteh, and V. Balakrishnan, "Performance Analysis of NVMe SSDs and their Implication on Real World Databases," in Proceedings of SYSTOR, 2015.

C. Boettiger, "An introduction to docker for reproducible research," ACM SIGOPS Operating Systems Review, vol. 49, No. 1, pp. 71-79, 2015.

M. Canim, G. A. Mihaila, B. Bhattacharjee, K. A. Ross, and C. A. Lang, "SSD bufferpool extensions for database systems," Proceedings of the VLDB Endowment, vol. 3, No. 1-2, pp. 1435-1446, 2010.

L.-P. Chang, "Hybrid solid-state disks: combining heterogeneous NAND flash in large SSDs," in 2008 Asia and South Pacific Design Automation Conference. IEEE, 2008, pp. 428-433.

G. Soundararajan, V. Prabhakaran, M. Balakrishnan, and T. Wobber, "Extending SSD lifetimes with disk-based write caches." in FAST, vol. 10, 2010, pp. 101-114.

H. Jo, Y. Kwon, H. Kim, E. Seo, J. Lee, and S. Maeng, "SSD-HDD-hybrid virtual disk in consolidated environments," in European Conference on Parallel Processing. Springer, 2009, pp. 375-384.

T. Luo, R. Lee, M. Mesnier, F. Chen, and X. Zhang, "hStorage-DB: heterogeneity-aware data management to exploit the full capability of hybrid storage systems," Proceedings of the VLDB Endowment, vol. 5, No. 10, pp. 1076-1087, 2012.

R. Chin and G. Wu, "Non-volatile memory data storage system with reliability management," May 25, 2009, U.S. Appl. No. 12/471,430.

B. aDam LeVenthaL, "Flash storage memory," Communications of the ACM, vol. 51, No. 7, pp. 47-51, 2008.

Y. Wang, K. Goda, M. Nakano, and M. Kitsuregawa, "Early experience and evaluation of file systems on SSD with database applications," in Networking, Architecture and Storage (NAS), 2010 IEEE Fifth International Conference on. IEEE, 2010, pp. 467-476.

D. Narayanan, E. Thereska, A. Donnelly, S. Elnikety, and A. Rowstron, "Migrating server storage to SSDs: analysis of tradeoffs," in Proceedings of the 4th ACM European conference on Computer systems. ACM, 2009, pp. 145-158.

D. Schall, V. Hudlet, and T. Ha rder, "Enhancing energy efficiency of database applications using SSDs," in Proceedings of the Third C* Conference on Computer Science and Software Engineering. ACM, 2010, pp. 1-9.

S. Park and K. Shen, "A performance evaluation of scientific I/O work-loads on flash-based SSDs," in 2009 IEEE International Conference on Cluster Computing and Workshops. IEEE, 2009, pp. 1-5.

S. Boboila and P. Desnoyers, "Performance models of flash-based solid-state drives for real workloads," in 2011 IEEE 27th Symposium on Mass Storage Systems and Technologies (MSST). IEEE, 2011, pp. 1-6.

H. Fujii, K. Miyaji, K. Johguchi, K. Higuchi, C. Sun, and K. Takeuchi, "x11 performance increase, x6. 9 endurance enhancement, 93% energy reduction of 3D TSV-integrated hybrid ReRAM/MLC NAND SSDs by data fragmentation suppression," in 2012 symposium on VLSI circuits (VLSIC). IEEE, 2012, pp. 134-135.

T. Y. Kim, D. H. Kang, D. Lee, and Y. I. Eom, "Improving performance by bridging the semantic gap between multi-queue SSD and I/O virtualization framework," in 2015 31st Symposium on Mass Storage Systems and Technologies (MSST). IEEE, 2015, pp. 1-11.

K. Li, H. Liu, Y. Wu, and X. Xu, "A two-dimensional bin-packing problem with conflict penalties," International Journal of Production Research, vol. 52, No. 24, pp. 7223-7238, 2014.

N. Karmarkar and R. M. Karp, "An efficient approximation scheme for the one-dimensional bin-packing problem," in Foundations of Computer Science, 1982. SFCS'08. 23rd Annual Symposium on. IEEE, 1982, pp. 312-320.

A. Scholl, R. Klein, and C. Jürgens, "Bison: A fast hybrid procedure for exactly solving the one-dimensional bin packing problem," Com-puters & Operations Research, vol. 24, No. 7, pp. 627-645, 1997.

R. Sridhar, M. Chandrasekaran, C. Sriramya, and T. Page, "Optimization of heterogeneous Bin packing using adaptive genetic algorithm," in IOP Conference Series: Materials Science and Engineering, vol. 183, No. 1.IOP Publishing, 2017, p. 012026.

B. Schulze, L. Paquete, K. Klamroth, and J. R. Figueira, "Bi-dimensional knapsack problems with one soft constraint," Computers & Operations Research, vol. 78, pp. 15-26, 2017.

T. K. Ghosh, S. Das, S. Barman, and R. Goswami, "A Comparison Between Genetic Algorithm and Cuckoo Search Algorithm to Minimize the Makespan for Grid Job Scheduling," in Advances in Computational Intelligence: Proceedings of International Conference on Computational Intelligence 2015. Springer, 2017, pp. 141-147.

M. Paul, R. Sridharan, and T. R. Ramanan, "A multi-objective decision-making framework using preference selection index for assembly job shop scheduling problem," International Journal of Management Concepts and Philosophy, vol. 9, No. 4, pp. 362-387, 2016.

H. Afsar, P. Lacomme, L. Ren, C. Prodhon, and D. Vigo, "Resolution of a Job-Shop problem with transportation constraints: a master/slave approach," IFAC-PapersOnLine, vol. 49, No. 12, pp. 898-903, 2016.

M. Hasenstein, "The logical volume manager (LVM)," White paper, 2001.

G. Banga, I. Pratt, S. Crosby, V. Kapoor, K. Bondalapati, and V. Dmitriev, "Approaches for efficient physical to virtual disk conversion," 2013, U.S. Appl. No. 13/302,123.

A. MySQL, "MySQL database server," Internet WWW page, at URL: http://www. mysql.com, 2004.

(56) References Cited

OTHER PUBLICATIONS

A. Lakshman and P. Malik, "Cassandra: a decentralized structured storage system," ACM SIGOPS Operating Systems Review, vol. 44, No. 2, pp. 35-40, 2010.
Francois, W. Raab, A. Kohler, and Shah, MySQL TPC-C benchmark, (accessed Sep. 6, 2016). [Online]. Available: http://www.tpc.org/tpcc/detail.asp.
Cassandra-stress benchmark, (accessed Sep. 6, 2016). [Online]. Available: https://docs.datastax.com/en/cassandra/2.1/cassandra/tools/toolsCStress t.html.
FIO—flexible I/O benchmark, (accessed Sep. 7, 2016). [Online]. Available: http://linux.die.net/man/1/fio.
Bhimani, Janki, et al. "Understanding performance of i/o intensive containerized applications for nvme ssds." Performance Computing and Communications Conference (IPCCC), 2016 IEEE 35th International. IEEE, 2016.
Felter, Wes, et al. "An updated performance comparison of virtual machines and linux containers." Performance Analysis of Systems and Software (ISPASS), 2015 IEEE International Symposium On. IEEE, 2015.
Seo, Kyoung-Taek, et al. "Performance comparison analysis of linux container and virtual machine for building cloud." Advanced Science and Technology Letters 66 (2014): 105-111.
Merkel, Dirk. "Docker: lightweight linux containers for consistent development and deployment." Linux Journal 2014.239 (2014): 2.

\* cited by examiner

CONTAINER WORKLOAD SCHEDULER AND METHODS OF SCHEDULING CONTAINER WORKLOADS

CROSS-REFERENCE TO RELATED APPLICATION(S)

The present application claims priority to and the benefit of U.S. Provisional Application No. 62/522,630, filed Jun. 20, 2017, entitled "UNDERSTANDING PERFORMANCE OF I/O INTENSIVE CONTAINERIZED APPLICATIONS FOR NVME SSDS," the entire contents of which are incorporated herein by reference.

FIELD

The present disclosure relates generally to the scheduling of containerized workloads.

BACKGROUND

A container, such as those of the DOCKER system, is a stand-alone software package that can run isolated on a shared operating system. Containers are quickly becoming one of the most important tools in DevOps as well as production environments both in the Enterprise and the Datacenters. However, container orchestration, scheduling, and performance present challenges across the industry. For instance, determining what containers to start when and what to migrate where is a problem which requires proper scheduling. These decisions are dependent on factors like when multiple application containers are running simultaneously with different workloads, the throughput of some applications may be compromised significantly compared to other application containers (e.g., there may be an unfair throughput of some application workloads). Such unfair throughput is generally undesirable by the user and may violate service provider service level agreements (SLAs). Additionally, the performance benefits obtained by simultaneously operating multiple instances of the same application (i.e., a homogenous environment) and simultaneously operating multiple instances of different applications (i.e., a heterogeneous environment) may vary significantly with related art containers. Moreover, the performance of I/O intensive dockerized workloads on recent innovations in storage and disk systems, such as high performance non-volatile memory express (NVMe) and solid state drives (SSDs), are not well understood and have not been investigated. The initiation time for containers is negligible when compared to that of virtual machines, and therefore it is not required to start all containers at the beginning, but the decision of when to start which container affects the performance. Therefore, it is beneficial to have container orchestration or scheduling.

SUMMARY

The present disclosure is directed to various embodiments of a system for scheduling the execution of container workloads from a series of applications and a series of containers of each application of the series of applications. The system includes a processor and a non-transitory computer-readable storage medium having instructions stored thereon, which, when executed by the processor, cause the system to calculate a conflict penalty matrix including a conflict penalty for each potential combination of container workloads of the series of containers, and calculate a minimum total conflict penalty of the container workloads and a number of workload batches for executing the container workloads. The number of workload batches is associated with the minimum total conflict penalty. The instructions, when executed by the processor, further cause the system to assign the container workloads to the workload batches based on the minimum total conflict penalty and the number of the workload batches.

The instructions, when executed by the processor, may further cause the system to assign each of the series of container workloads to one workload character bin of a series of workload character bins.

The system may be configured to calculate the minimum total conflict penalty and the number of workload batches by solving an objective function defined as a maximum of a summation of a normalized conflict penalty and a normalized number of workload batches.

The system may be configured to solve the objective function utilizing two linear algorithms implementing constrained matrix optimization. The two linear algorithms may include an interior point (IP) algorithm and a standard quadratic programming (SQP) algorithm.

The system may be configured to calculate a local minimum of the objective function. The system may be configured to calculate a global minimum of the objective function.

The present disclosure is also directed to various embodiments of a method of scheduling the execution of container workloads from a series of applications and a series of containers of each application of the series of applications. The method includes executing, by a processor, instructions stored on a non-transitory physical medium, calculating a conflict penalty matrix including a conflict penalty for each potential combination of container workloads of the series of containers, and calculating a minimum total conflict penalty of the container workloads and a number of workload batches for executing the container workloads. The number of workload batches is associated with the minimum total conflict penalty. The method also includes assigning the container workloads to the workload batches based on the minimum total conflict penalty and the number of the workload batches.

The method may also include assigning each of the series of container workloads to one workload character bin of a series of workload character bins.

The method may include calculating the minimum total conflict penalty and the minimum number of workload batches by solving an objective function defined as a maximum of a summation of a normalized conflict penalty and a normalized number of workload batches. Solving the objective function may include utilizing two linear algorithms implementing constrained matrix optimization. The two linear algorithms may include an interior point (IP) algorithm and a standard quadratic programming (SQP) algorithm.

The method may include setting a maximum number of container workloads that may be assigned to one of the workload batches.

The present disclosure is also directed to various embodiments of a system for scheduling the execution of container workloads to different nodes at runtime from a series of applications and a series of containers of each application of the series of applications. The system includes a processor and a non-transitory computer-readable storage medium having instructions stored thereon, which, when executed by the processor, cause the system to calculate a conflict penalty matrix including a conflict penalty for each potential combination of container workloads of the plurality of containers, and calculate a minimum of a total conflict penalty of the container workloads and a number of nodes for executing the container workloads. The number of nodes is associated with the minimum total conflict penalty. The instructions, when executed by the processor, further cause the system to assign the container workloads to the nodes based on the minimum total conflict penalty and the number of the nodes.

The conflict penalty for each potential combination of container workloads may be calculated based on a weighted sum of resource utilization parameters associated with running each potential combination of container workloads on the nodes. The resource utilization parameters may include CPU utilization, memory utilization, and/or disk utilization.

The weighted sum may be based on user-assigned weights at run time. The weights my include processing power of each node and/or storage capacity.

The instructions, when executed by the processor, may cause the system to re-compute the conflict penalty matrix at a fixed time interval.

The instructions, when executed by the processor, may cause the system to re-compute the conflict penalty matrix when utilization of a resource on a node exceeds a threshold.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various systems and methods for scheduling the execution of container workloads to workload batches from a series of applications and a series of containers of each type of application. When two or more container workloads are scheduled together in the same workload batch, there is a conflict penalty associated with running the two or more workload containers simultaneously in the same workload batch depending on the workload character of the container workloads (e.g., sequential write intensive workloads, random write intensive workloads, read intensive workloads). The systems and methods of the present disclosure are configured to minimize the total conflict penalty of the workload batches and minimize the number of workload batches by grouping the container workloads into workload batches based on the conflict penalty associated with the grouped container workloads (e.g., a controller is configured to packetize container workloads into different workload batches such that the operation penalty of the number of workload batches are minimized). In this manner, various systems and methods of the present disclosure are configured to perform a static initialization of the containers to determine when the container workloads will be executed.

The present disclosure is also directed to various systems and methods for scheduling container workloads to different nodes at runtime. The systems and methods of the present disclosure are configured to minimize the total conflict penalty, which depends on the character of the container workloads and various characteristics of the node (e.g., processing power of the node and storage capacity), and minimize the number of nodes. Minimizing the total number of nodes and minimizing the total conflict penalty is configured to maximize overall resource utilization (e.g., maximize disk, memory, and CPU utilization). In this manner, various systems and methods of the present disclosure are configured to perform dynamic container workload to node scheduling.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The term "processor" is used herein to include any combination of hardware, firmware, and software, employed to process data or digital signals. The hardware of a processor may include, for example, application specific integrated circuits (ASICs), general purpose or special purpose central processors (CPUs), digital signal processors (DSPs), graphics processors (GPUs), and programmable logic devices such as field programmable gate arrays (FPGAs). In a processor, as used herein, each function is performed either by hardware configured, i.e., hard-wired, to perform that function, or by more general purpose hardware, such as a CPU, configured to execute instructions stored in a non-transitory storage medium. A processor may be fabricated on a single printed wiring board (PWB) or distributed over several interconnected PWBs. A processor may contain other processors; for example a processor may include two processors, an FPGA and a CPU, interconnected on a PWB.

Figure 1:
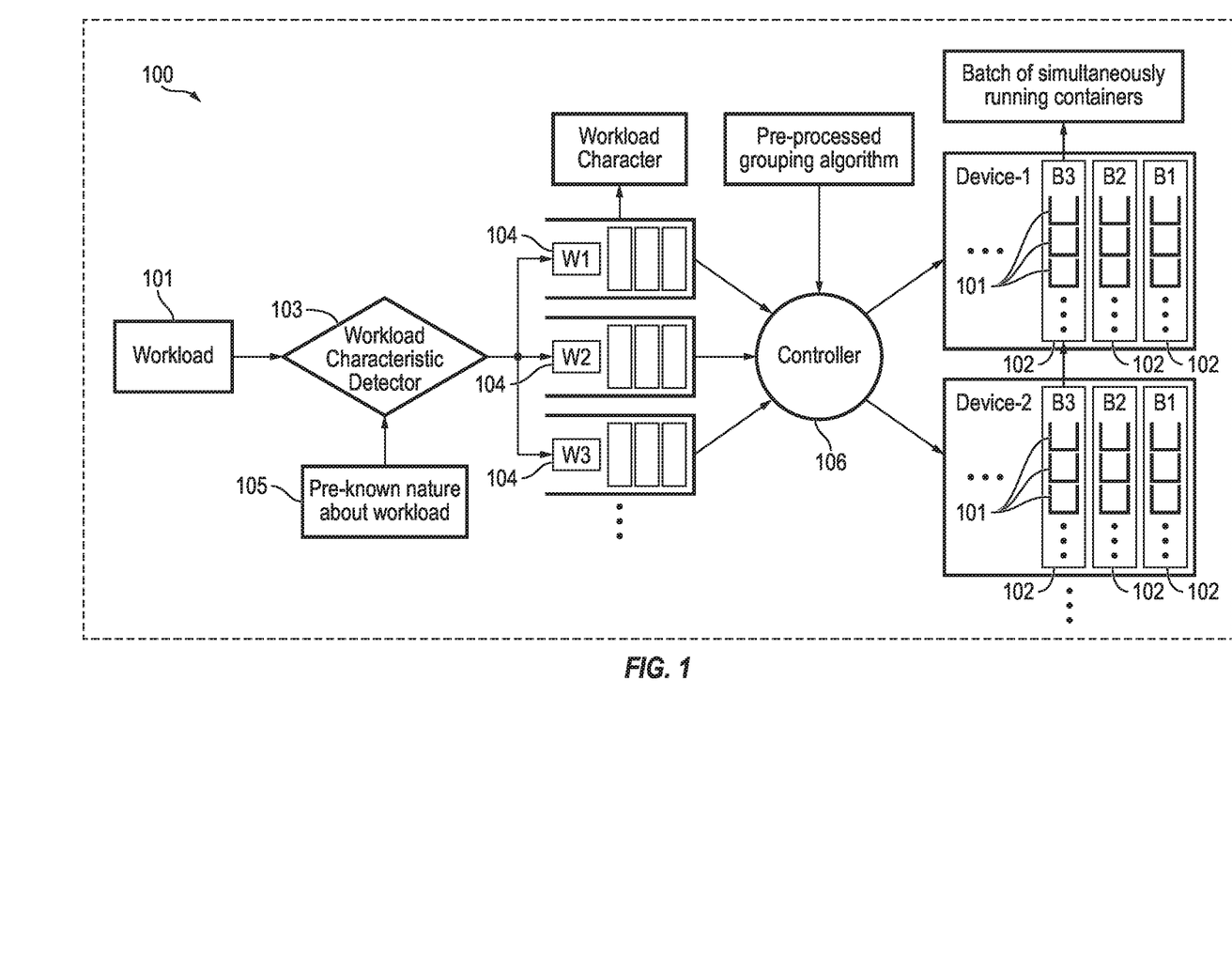
FIG. 1 is a schematic block diagram of a system and method for scheduling container workloads to workload batches according to one embodiment of the present disclosure.

FIG. 1 is a schematic diagram of a system and method 100 according to one embodiment of the present disclosure for scheduling the execution of container workloads 101 into workload batches 102 from a series of n applications and a series of m containers of each type of application (i.e., a total of n*m workload containers), where n and m are both positive integers. The system and method illustrated in FIG. 1 is a static initialization of the containers workloads 101 to determine when the container workloads will be executed (i.e., a static initialization to determine the workload batch 102 in which the container workloads 101 will be executed). As illustrated in FIG. 1, the system and method 100 detects the characteristic of the container workloads 101 with a workload characteristic detector 103 and assigns each of the container workloads 101 to one of a series of workload character bins 104 (e.g., W1, W2, or W3), such as, for instance, a sequential write intensive workload character bin, a random write intensive workload character bin, or a read intensive workload character bin. Other bins may also be used. A controller 106 of the system and method 100 illustrated in FIG. 1 also assigns a conflict penalty $S_{ij}$ associated with simultaneously running two or more container workloads 101 (Ai and Aj), each from different workload character bins 104, in the same workload batch 102. The system and method 100 illustrated in FIG. 1 assigns the value of the conflict penalty $S_{ij}$ depending on the character 105 of the container workloads 101 (e.g., the value of the conflict penalty $S_{ij}$ is assigned based on the pre-known nature or character 105 of the container workloads 101 that is input to the workload characteristic detector 103). For instance, combining read intensive and write intensive container workloads 101 is beneficial from a performance standpoint, and therefore the conflict penalty $S_{ij}$ associated with simultaneously running a container workload $A_i$ assigned to the read intensive workload character bin 104 (e.g., W1) and a container workload $A_j$ assigned to the write intensive workload character bin 104 (e.g., W2) may be set to a lower value (e.g., 0). Additionally, combining random and sequential write container workloads 101 is detrimental from a performance perspective, and therefore the conflict penalty $S_{ij}$ associated with simultaneously running a container workload Ai assigned to the random write workload character bin 104 (e.g., W3) and a container workload Aj assigned to the sequential write workload character bin 104 (e.g., W2) may be set to a higher positive value. Suitable systems and methods for balancing workloads of containers by grouping the containers based on characteristics of the workloads of the containers are described in U.S. application Ser. No. 15/379,327, filed on Dec. 14, 2016, entitled "Multi-Container Workload Balancing for Optimal Disk Usage", the entire content of which is incorporated herein by reference.

Table 1 below is an example of a conflict penalty matrix (S) generated by calculating the conflict penalty Sij associated with each possible combination of container workloads. The size of the conflict penalty matrix (S) is n*m×n*m, where n is the number of applications and m is the number of container of each type of application. As shown in Table 1, the conflict penalty matrix is symmetric with respect to the diagonal, and all diagonal elements are set to null because there is no conflict penalty associated with simultaneously running two container workloads of the same workload character bin (i.e., there is no conflict penalty associated with running the same container workload more than once in the same workload batch).

TABLE 1

|       | $A_1$ | $A_2$ | $A_3$ | ... | $A_j$ | ... | $A_{(n*m)}$ |
|-------|-------|-------|-------|-----|-------|-----|-------------|
| $A_1$ | 0 | 1 | 2 |  | $S_{ij}$ |  | 3 |
| $A_2$ | 1 | 0 | 4 |  | $S_{2j}$ |  | 1 |
| $A_3$ | 2 | 4 | 0 |  | $S_{3j}$ |  | 5 |
| . |  |  |  | ... |  | ... |  |
| . |  |  |  |  |  |  |  |
| . |  |  |  |  |  |  |  |
| $A_i$ | $S_{i1}$ | $S_{i2}$ | $S_{i3}$ |  | $S_{ij}$ |  | $S_{i(n*m)}$ |
| . |  |  |  |  | . |  |  |
| . |  |  |  |  | . |  |  |
| . |  |  |  |  | . |  |  |
| $A_{(n*m)}$ | 3 | 1 | 5 |  | $S_{(n*m)j}$ |  | 0 |

Each workload container is assigned to one and only one workload batch to decide when to start it or where to migrate it. Table 2 below depicts a bin packing matrix (P) depicting the workload batches of simultaneously running container workloads. The workload batches $Z_1$ to $Z_{(n*m)}$ are run sequentially over time t. In Table 2, a "1" denotes that the container workload is run in the workload batch and a "0" denotes that the container workload is not run in the workload batch. For instance, Table 2 depicts that container workloads $A_3$ and $A_{(n*m)}$ are run in the first workload batch $Z_1$, and container workload $A_1$ is run in the second workload batch $Z_2$.

TABLE 2

|       | $Z_1$ | $Z_2$ | $Z_3$ | ... | $Z_k$ | ... | $Z_{(n*m)}$ |
|-------|-------|-------|-------|-----|-------|-----|-------------|
| $A_1$ | 0 | 1 | 0 |  | $P_{1k}$ |  | 0 |
| $A_{i2}$ | $P_{i1}$ | $P_{i2}$ | $P_{i3}$ | ... | $P_{ik}$ | ... | $P_{i(n*m)}$ |
| $A_3$ | 1 | 0 | 0 |  | $P_{3k}$ |  | 0 |
| . |  |  |  | ... |  | ... |  |
| . |  |  |  |  |  |  |  |
| . |  |  |  |  |  |  |  |
| $A_j$ | $P_{j1}$ | $P_{j2}$ | $P_{j3}$ |  | $P_{jk}$ |  | $P_{j(n*m)}$ |
| . |  |  |  |  | . |  |  |
| . |  |  |  |  | . |  |  |
| . |  |  |  |  | . |  |  |
| $A_{(n*m)}$ | 1 | 0 |  |  | $P_{(n*m)k}$ |  | 0 |

With continued reference to FIG. 1, the system and method 100 (e.g., the controller 106) also includes a task of minimizing the total conflict penalty ($T_p$) of the workload batches and minimizing the total number of workload batches ($N_z$). The total conflict penalty ($T_p$) is defined as follows $T_p = \Sigma_{k=1}^{n*m} \Sigma_{j=1}^{n*m} \Sigma_{i=j}^{n*m} S_{ij} P_{ik} P_{jk}$, where $S_{ij}$ is the conflict penalty associated with simultaneously running container workload $A_i$ and container workload $A_j$ in the same workload batch, $P_{ik}$ is a binary variable that equals 1 if container workload $A_i$ is assigned to workload batch k and is otherwise 0. Additionally, the total number of workload batches ($N_z$) is defined as follows $N_z = \Sigma_{k=1}^{m} z_k$, where $z_k$ is a binary variable that equals 1 if workload batch k is used and is otherwise 0.

In one or more embodiments, the task of minimizing the total conflict penalty ($T_p$) of the workload batches and minimizing the total number of workload batches ($N_z$) is performed by transforming the equations above defining the total conflict penalty ($T_p$) and the total number of workload batches ($N_z$) into an objective function (f). Transforming these equations into an objection function includes normalizing the conflict penalty value and the number of workload batches to adjust their values to follow a notional common scale between 0 and 1. The objective function (f) is then defined by maximizing the summation of these two normalized ratios. Accordingly, the objective function (f) converts the task of minimizing the total conflict penalty ($T_p$) of the workload batches and minimizing the total number of workload batches ($N_z$) into a task of determining the bin packing matrix (P) that maximizes the summation of the normalized conflict penalty and the normalized number of workload batches. The objective function f is defined as follows:

$$f = \text{Max}\left\{\left[\frac{\text{Max}_p - T_p}{\text{Max}_p - \text{Min}_p}\right] + \left[\frac{\text{Max}_z - N_z}{\text{Max}_z - \text{Min}_z}\right]\right\},$$

where $\text{Max}_p$ is the maximum possible conflict penalty for a given conflict penalty matrix (S) by running all of the container workloads in the same workload batch k, $\text{Min}_p$ is the minimum possible conflict penalty for a given conflict penalty matrix (S) by running only one container workload in each batch (i.e., $\text{Min}_p = 0$ because there is no conflict penalty associated with running each of the container workloads in separate workload batches), $\text{Max}_z$ is the maximum possible number of batches (i.e., $\text{Min}_z = n*m$, where n is the number of applications and m is the number of containers of each type of application), and Min is the minimum possible number of batches (i.e., $\text{Min}_z = 1$ because all of the container workloads may be run in a single workload batch). The bin packing matrix (P) that satisfies the objective function (f) defined above provides scheduling information (i.e., the bin packing matrix (P) that satisfies the objective function (f) contains information for scheduling the assignment of container workloads to the workload batches to minimize the total conflict penalty and to minimize the number of workload batches).

Additionally, in one or more embodiments, one or more constraints C may be utilized to solve the objective function (f). In one embodiment, constraint C1 is utilized to indicate if container workload Ai runs in workload batch k. Constraint C1 is defined as follows: C1: $P_{ik} \in \{0,1\} \forall$ workload $A_i$ and batch k. Accordingly, Pik is set to 1 if workload Ai is run in workload batch k and is set to 0 otherwise (i.e., Pik is set to 0 if container workload Ai is not run in workload batch k).

In one or more embodiments, constraint C2 is utilized to ensure that each container workload is run in only one workload batch. Constraint C2 is defined as follows: C2: $\Sigma_{k=1}^{n*m} P_{ik} = 1 \forall$ workload $A_i$.

In one or more embodiments, constraint C3 is utilized to limit the maximum number of simultaneous container workloads that may be assigned to the same workload batch k. Constraint C3 is defined as follows: C3: $\Sigma_{i=1}^{n*m} P_{ik} \leq \varphi \forall$ batch k, where $\varphi$ is the maximum number of container workloads that may be assigned to any given workload batch k. In one or more embodiments, constraint C3 may not be utilized.

In one or more embodiments, the task of minimizing the total conflict penalty ($T_p$) of the workload batches may include a brute force evaluation of the objective function f by generating all possible bin packing matrices (P) and selecting the bin packing matrix (P) that minimizes the total conflict penalty ($T_p$). In one or more embodiments, the task of minimizing the total conflict penalty ($T_p$) of the workload batches may be performed by utilizing two linear programming algorithms by implementing constrained matrix optimization. In one or more embodiments, Interior Point (IP) and Standard Quadratic Programming (SQP) algorithms such as those provided in MATLAB are utilized to minimize the total conflict penalty ($T_p$) of the workload batches by computing the bin packing matrix (P) that satisfies the objective function f. In one or more embodiments, solving the objective function f to find the bin packing matrix (P) that minimizes the total conflict penalty ($T_p$) may include searching for a local minimum or a global minimum.

In the illustrated embodiment, the system and method 100 also includes assigning, with the controller 106, the container workloads 101 to the workload batches 102 based on the bin packing matrix (P) that minimizes the total conflict penalty ($T_p$) of the workload batches 102 and minimizes the total number of workload batches 102 ($N_z$) (i.e., controller 106 assigns the container workloads 101 to the workload batches 102 based on the bin packing matrix (P) that satisfies the objective function f defined above).

Additionally, in one or more embodiments, the system and method 100 simultaneously runs the container workloads 101 assigned to the first workload batch 102 (e.g., B1) and sequentially runs each of the workload batches 102 (e.g., B2 and then B3) over time (e.g., the system and method 100 instantiates the container workloads 101 according to the assignment of container workloads 101 to the workload batches 102 contained in the bin packing matrix (P) that satisfies the objective function f).

In this manner, the system and method 100 is configured to schedule the execution of container workloads 101 into workload batches 102 based on their workload nature and mutual interaction to minimize unfair application interference and thereby maximize resource utilization (e.g., maximize disk, memory, and CPU utilization). That is, the system and method 100 according to one embodiment of the present disclosure is configured to determine and schedule which container workloads 101 will be run together and when the container workloads 101 will be run. In contrast, running a single container workload in each workload batch (i.e., maximizing the number of workload batches to be equal to the total number of container workloads (n*m)), may result in the system resources not being fully utilized and would not permit the execution time of the applications to be reduced. Additionally, in contrast to the present system and method, running all of the container workloads in the same workload batch would cause all of the applications to be competing for available resources, which may lead to contention and throttling.

In one or more embodiments, the above-described tasks may be implemented on a controller. In one or more embodiments, the above-described tasks may be implemented on the host side as a source management plug-in module.

Figure 2:
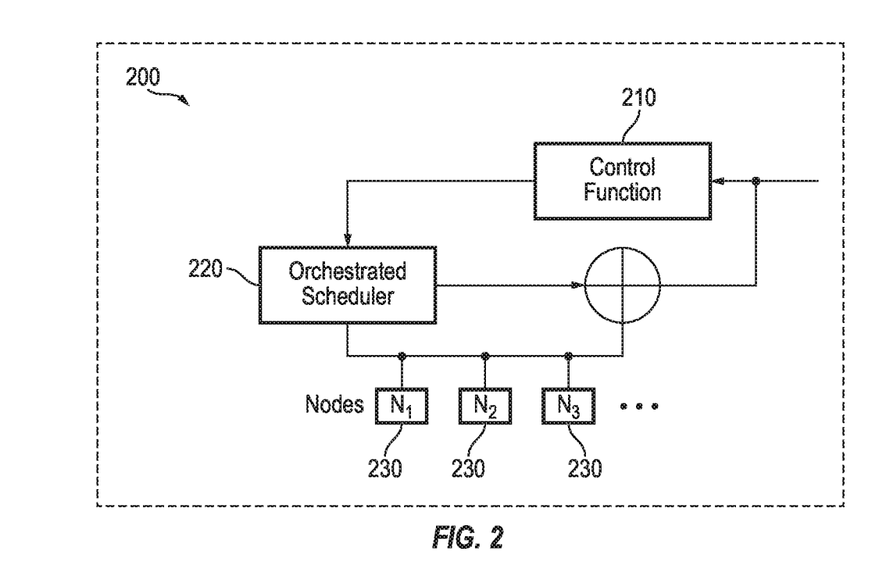
FIG. 2 is a schematic block diagram of a system and method for scheduling container workloads to nodes according to one embodiment of the present disclosure.

FIG. 2 is a schematic block diagram of a system and method 200 for scheduling container workloads to different nodes at runtime from a series of n applications and a series of m containers of each type of application (i.e., a total of n*m container workloads), where n and m are both positive integers (i.e., a runtime to node scheduling system and method). That is, the system and method 200 according to one or more embodiments of the present disclosure is configured to determine and schedule which container workloads will be executed on which node.

As illustrated in FIG. 2, the system and method 200 includes a control function block 210 and an orchestrated scheduler block 220 for scheduling container workloads to different nodes 230 (e.g., $N_1$, $N_2$, $N_3$) at runtime. In the illustrated embodiment, each node 230 computes a conflict penalty matrix (S) associated with that node 230 and inputs the conflict penalty matrix (S) to the control function block 210. The control function block 210 is configured compute the bin packing matrix (P), which contains the optimum allocation of the workload containers to the nodes 230, by minimizing the number of nodes 230 ($N_z$) and minimizing the total conflict penalty ($T_p$) associated with assigning the container workloads to run in different nodes 230. That is, the control function block 210 contains an optimization function configured to minimize the number of nodes 230 ($N_z$) and minimize the total conflict penalty ($T_p$) associated with assigning the container workloads to run in different nodes 230 to maximize overall resource utilization, such as disk, memory, and/or CPU utilization. In the illustrated embodiment, the bin packing matrix (P) is output from the control function block 210 to the orchestrated scheduler block 220. The orchestrated scheduler block 220 is configured to instantiate the workload containers on the corresponding nodes 230 according to the assignment of workload containers to the nodes 230 contained in the bin packing matrix (P).

The system and method 200 is configured to assign a conflict penalty Sij associated with simultaneously running container workloads Ai and Aj on the same node 230 (e.g., $N_1$, $N_2$, or $N_3$). The value of the conflict penalty Sij depends on the character of the container workloads and various characteristics of the node 230, such as the processing power of the node 230, storage capacity, CPU utilization, memory utilization, and disk utilization. Each node 230 has its own conflict penalty matrix (S) that reflects the conflict penalty (i.e., cost) of running different combinations of container workloads on that node 230. In one or more embodiments, a conflict penalty matrix (S) may be generated by calculating the conflict penalty Sij associated with each possible combination of container workloads running on each of the nodes 230. The conflict penalty matrix (S) is calculated as follows:

$$S_{ij} = \frac{\sum_{i=1}^{n}(x_i * w_i)}{\sum_{i=1}^{n} w_i}$$

where $x_i$ is a resource utilization parameter, such as CPU utilization, memory utilization, and/or disk utilization, associated with running container workloads on a node 230. The parameter $w_i$ is a weight that may be assigned at run time by the user. The value of the weights $w_i$ may be selected depending, for instance, on the characteristics of the cluster environment, such as the processing power of each node 230 and storage capacity.

In one or more embodiments, the control function block 210 is configured to minimize the total conflict penalty ($T_p$) of running the workload batches on the nodes 230 and minimize the total number of nodes ($N_z$). The total conflict penalty ($T_p$) is defined as follows $T_p = \sum_{k=1}^{n*m} \sum_{j=1}^{n*m} \sum_{i=j}^{n*m} S_{ij}^{k} P_{ik} P_{jk}$, where $S_{ij}^{k}$ is the conflict penalty associated with simultaneously running container workload $A_i$ and container workload $A_j$ on the same node 230, and k stands for the node 230 (i.e., the $k^{th}$ node). $P_{ik}$ is a binary variable that equals 1 if container workloads $A_i$ and $A_j$ are assigned to run on node k and is otherwise 0. Accordingly, if container workloads $A_i$ and $A_j$ are run on node k, conflict penalty Sij from the penalty matrix (S) of the $k^{th}$ node is applied. Additionally, the total number of nodes ($N_z$) is defined as follows $N_z = \sum_{k=1}^{m} z_k$, where $z_k$ is a binary variable that equals 1 if node k is used and is otherwise 0.

Minimizing the total number of nodes ($N_z$) and minimizing the total conflict penalty (Tp) is configured to maximize overall resource utilization (e.g., maximize disk, memory, and CPU utilization).

Each of the container workloads runs only once and therefore each container workload is assigned to only one node (node_1 through node_(n*m)). Table 3 below depicts a bin packing matrix (P) depicting the batch of container workloads running on the same node (e.g., node_1, node_2, node_3, etc.). In Table 3, a "1" denotes that the container workload is run on the node and a "0" denotes that the container workload is not run on the node. For instance, Table 3 depicts that container workloads $A_3$ and $A_{(n*m)}$ are both run on the first node node_1, and container workload $A_1$ is run on the second node node_2.

TABLE 3

|  | Node_1 | Node_2 | Node_3 | ... | Node_k | ... | Node_(n*m) |
|---|---|---|---|---|---|---|---|
| $A_1$ | 0 | 1 | 2 |  | $P_{1k}$ |  | 0 |
| $A_{i2}$ | $P_{i1}$ | $P_{i2}$ | $P_{i3}$ |  | $P_{ik}$ |  | $P_{i(n*m)}$ |
| $A_3$ | 1 | 0 | 0 |  | $P_{3k}$ |  | 0 |
| . |  |  |  | ... |  | ... |  |
| . |  |  |  |  |  |  |  |
| . |  |  |  |  |  |  |  |
| $A_j$ | $P_{j1}$ | $P_{j2}$ | $P_{j3}$ |  | $P_{jk}$ |  | $P_{j(n*m)}$ |
| . |  |  |  |  |  |  |  |
| . |  |  |  |  |  |  |  |
| . |  |  |  |  |  |  |  |
| $A_{(n*m)}$ | 1 |  | 0 |  | $P_{(n*m)k}$ |  | 0 |

In one or more embodiments, the bin packing matrix (P) may expand at runtime due to new or modified application containers being started and/or new nodes 230 being added to the system 200. Accordingly, in one or more embodiments, the system and method 200 may be configured to re-compute the conflict penalty matrix (S) at a fixed time interval and/or at defined trigger points (e.g., when the utilization of any resource on a node 230 exceeds its threshold, thereby triggering a re-allocation or re-deployment of its hosted containers).

The control function block 210 may be implemented in any suitable location. In one or more embodiments, the control function block 210 may be implemented on the host side as a source management plug-in module.

Figure 3:
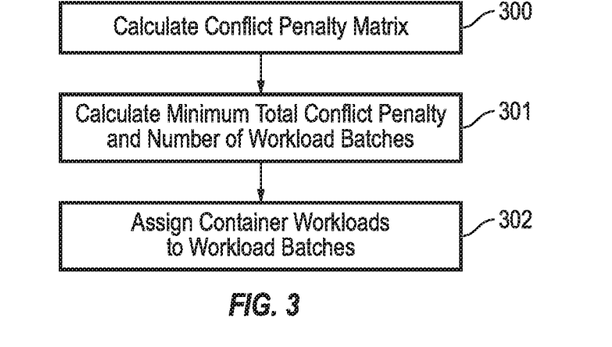
FIG. 3 is a flow diagram illustrating scheduling container workloads to workload batches by a controller of FIG. 1 according to one embodiment of the present disclosure.

FIG. 3 is a flow diagram illustrating scheduling container workloads to workload batches by the controller 106 of FIG. 1 according to one embodiment of the present disclosure. As illustrated in FIG. 3, the controller 106 calculates a conflict penalty matrix including a conflict penalty for each potential combination of container workloads based upon the pre-known nature or character of the container workloads (300). The controller 106 also calculates a minimum total conflict penalty of the container workloads and a number of workload batches for executing the container workloads (301). The number of workload batches is associated with the minimum total conflict penalty. In the illustrated embodiment, the controller 106 also assigns the container workloads to the workload batches based on the minimum total conflict penalty and the number of the workload batches (302).

Figure 4:
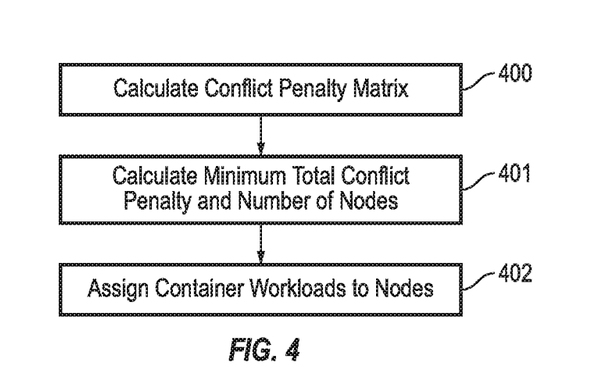
FIG. 4 is a flow diagram illustrating scheduling container workloads to nodes by a control function and an orchestrated scheduler of FIG. 2 according to one embodiment of the present disclosure.

FIG. 4 is a flow diagram illustrating scheduling container workloads to nodes by the control function block 210 and the orchestrated scheduler 220 of FIG. 2 according to one embodiment of the present disclosure. As illustrated in FIG. 4, the control function block 210 calculates a conflict penalty matrix including a conflict penalty for each potential combination of container workloads (400). The value of the conflict penalty depends on the character of the container workloads and various characteristics of the nodes, such as the processing power of the nodes, storage capacity, CPU utilization, memory utilization, and disk utilization. The control function block 210 also calculates a minimum of a total conflict penalty of the container workloads and a number of nodes for executing the container workloads (402). The number of nodes is associated with the minimum total conflict penalty. In the illustrated embodiment, the orchestrated scheduler 220 then assigns the container workloads to the nodes based on the minimum total conflict penalty and the number of the nodes (403).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system for scheduling the execution of container workloads from a plurality of applications and a plurality of containers of each application of the plurality of applications, the system comprising:
    a processor; and
    a non-transitory computer-readable storage medium having instructions stored thereon, which, when executed by the processor, cause the system to:
        calculate a conflict penalty matrix comprising a conflict penalty for potential combinations of container workloads of the plurality of containers based on workload characteristics of the container workloads in the potential combinations, the conflict penalty being associated with performance of simultaneously running the container workloads in a potential combination in a same workload batch, the workload characteristics being selected from the group consisting of a read intensive workload, a write intensive workload, a random write workload, and a sequential write workload;
        calculate a minimum total conflict penalty of the container workloads and a number of workload batches for executing the container workloads, the number of workload batches being associated with the minimum total conflict penalty; and
        assign the container workloads to the workload batches based on the minimum total conflict penalty and the number of the workload batches.

2. The system of claim 1, wherein the instructions, when executed by the processor, further cause the system to assign each of the plurality of container workloads to one workload character bin of a plurality of workload character bins.

3. The system of claim 1, wherein the system is configured to calculate the minimum total conflict penalty and the number of workload batches by solving an objective function defined as a maximum of a summation of a normalized conflict penalty and a normalized number of workload batches.

4. The system of claim 3, wherein the system is configured to solve the objective function utilizing two linear algorithms implementing constrained matrix optimization.

5. The system of claim 4, wherein the two linear algorithms comprise an interior point (IP) algorithm and a standard quadratic programming (SQP) algorithm.

6. The system of claim 4, wherein system is configured to calculate a local minimum of the objective function.

7. The system of claim 4, wherein the system is configured to calculate a global minimum of the objective function.

8. A method of scheduling the execution of container workloads from a plurality of applications and a plurality of containers of each application of the plurality of applications, the method comprising:
    executing, by a processor, instructions stored on a non-transitory physical medium;
    calculating a conflict penalty matrix comprising a conflict penalty for potential combinations of container workloads of the plurality of containers based on workload characteristics of the container workloads in the potential combinations, the conflict penalty being associated with a performance of simultaneously running the container workloads in a potential combination in a same workload batch, the workload characteristics being selected from the group consisting of a read intensive workload, a write intensive workload, a random write workload, and a sequential write workload;
    calculating a minimum total conflict penalty of the container workloads and a number of workload batches for executing the container workloads, the number of workload batches being associated with the minimum total conflict penalty; and
    assigning the container workloads to the workload batches based on the minimum total conflict penalty and the number of the workload batches.

9. The method of claim 8, further comprising assigning each of the plurality of container workloads to one workload character bin of a plurality of workload character bins.

10. The method of claim 8, further comprising calculating the minimum total conflict penalty and the minimum number of workload batches by solving an objective function defined as a maximum of a summation of a normalized conflict penalty and a normalized number of workload batches.

11. The method of claim 10, wherein the solving the objective function comprises utilizing two linear algorithms implementing constrained matrix optimization.

12. The method of claim 11, wherein the two linear algorithms comprise an interior point (IP) algorithm and a standard quadratic programming (SQP) algorithm.

13. The method of claim 8, further comprising setting a maximum number of container workloads that may be assigned to one of the workload batches.

14. A system for scheduling the execution of container workloads to different nodes at runtime from a plurality of applications and a plurality of containers of each application of the plurality of applications, the system comprising:
    a processor; and
    a non-transitory computer-readable storage medium having instructions stored thereon, which, when executed by the processor, cause the system to:
        calculate a conflict penalty matrix comprising a conflict penalty for potential combinations of container workloads of the plurality of containers based on workload characteristics of the container workloads in the potential combinations, the conflict penalty being associated with a performance of simultaneously running the container workloads in a potential combination in a same workload batch, the workload characteristics being selected from the group consisting of a read intensive workload, a write intensive workload, a random write workload, and a sequential write workload;
        calculate a minimum of a total conflict penalty of the container workloads and a number of nodes for executing the container workloads, the number of nodes being associated with the minimum total conflict penalty; and
        assign the container workloads to the nodes based on the minimum total conflict penalty and the number of the nodes.

15. The system of claim 14, wherein the conflict penalty for each potential combination of container workloads is calculated based on a weighted sum of resource utilization parameters associated with running each potential combination of container workloads on the nodes.

16. The system of claim 15, wherein the resource utilization parameters are selected from the group of parameters consisting of CPU utilization, memory utilization, and disk utilization.

17. The system of claim 15, wherein the weighted sum is based on user-assigned weights at run time.

18. The system of claim 17, wherein the weights are selected from the group consisting of processing power of each node and storage capacity.

19. The system of claim 14, wherein the instructions, when executed by the processor, cause the system to re-compute the conflict penalty matrix at a fixed time interval.

20. The system of claim 14, wherein the instructions, when executed by the processor, cause the system to re-compute the conflict penalty matrix when utilization of a resource on a node exceeds a threshold.

* * * * *